United States Patent
Wen et al.

(10) Patent No.: US 9,405,302 B2
(45) Date of Patent: Aug. 2, 2016

(54) METHOD AND APPARATUS FOR CONTROLLING TEMPERATURE OF DATA CARD

(75) Inventors: Hailong Wen, Guangdong (CN); Hai Jian, Guangdong (CN); Bo Gao, Guangdong (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 614 days.

(21) Appl. No.: 13/876,868

(22) PCT Filed: Mar. 7, 2011

(86) PCT No.: PCT/CN2011/071587
§ 371 (c)(1),
(2), (4) Date: Mar. 29, 2013

(87) PCT Pub. No.: WO2012/041041
PCT Pub. Date: Apr. 5, 2012

(65) Prior Publication Data
US 2013/0184895 A1     Jul. 18, 2013

(30) Foreign Application Priority Data
Sep. 29, 2010 (CN) .......................... 2010 1 0505967

(51) Int. Cl.
*G05D 23/00* (2006.01)
*G05D 23/19* (2006.01)
*G06F 1/20* (2006.01)

(52) U.S. Cl.
CPC ........ *G05D 23/1905* (2013.01); *G05D 23/1917* (2013.01); *G06F 1/206* (2013.01)

(58) Field of Classification Search
CPC ..... H04B 1/036; H04B 1/02; H04W 52/0251; G05D 23/1905; G05D 23/1917; G06F 1/206
USPC ........................... 700/274, 299; 337/218–416
See application file for complete search history.

(56) References Cited

U.S. PATENT DOCUMENTS

| 6,760,311 | B1 * | 7/2004 | Raith ..................... H04B 1/036 370/252 |
| 2008/0108331 | A1 | 5/2008 | Jing et al. |
| 2010/0091747 | A1 | 4/2010 | Dorsey et al. |
| 2011/0038265 | A1 * | 2/2011 | Tao .................. H04W 52/0225 370/241 |

FOREIGN PATENT DOCUMENTS

| CN | 1328687 A | 12/2001 |
| CN | 1411638 A | 4/2003 |

(Continued)

OTHER PUBLICATIONS

European Patent Office, Supplementary European Search Report.

*Primary Examiner* — Mohammad Ali
*Assistant Examiner* — Sheela S Rao
(74) *Attorney, Agent, or Firm* — Li & Cai Intellectual Property (USA) Office

(57) ABSTRACT

The disclosure provides a method and apparatus for controlling temperature of data card. The method includes the following steps: sampling the temperature of protected element on the data card; regulating the data transmission speed of the data card according to the sampled temperature to control the temperature of the data card. With the disclosure, the element aging or element damage of a wireless data card is avoided.

15 Claims, 3 Drawing Sheets

(56) References Cited

FOREIGN PATENT DOCUMENTS

| CN | 101 0981 74 A | 1/2008 |
| CN | 101631321 A | 1/2010 |
| EP | 1873913 A1 | 1/2008 |
| WO | WO 2006/059533 A1 | 6/2006 |

* cited by examiner

METHOD AND APPARATUS FOR CONTROLLING TEMPERATURE OF DATA CARD

FIELD OF THE INVENTION

The disclosure relates to the field of communications, and in particular to a method and apparatus for controlling temperature of data card.

BACKGROUND

With the development of mobile communication and the continuous evolution of 3G technology, the transmission speed of wireless data card terminal becomes higher and higher, and the size of the terminal becomes smaller and smaller. Thus heating of the data card becomes a significant problem. In general, after the data card operates for a period of time, the heating phenomenon occurs very easily. Therefore, some wireless data cards are even hot, which tends to cause the element aging and element damage, and may scald the user or cause fire.

Aiming at the problem, there are following two main solutions at present: optimizing the external design of the data card and decreasing the transmission power of the wireless terminal. The solution of optimizing the external design of the data card is selecting material with good heat dissipation and optimizing the external structure of the data card. For example, punching or notching on the metal material to increase the heat dissipation area is one of the solutions. However, this way cannot solve the heating problem of the data card radically and increases the cost. The next solution of decreasing the transmission power of the wireless terminal deems that heating of the wireless terminal mainly results from power amplifier, and heating of the power amplifier relates to uplink transmission power. That means the temperature of device is controlled by decreasing the transmission power when the temperature reaches a certain threshold. The transmitter is immediately turned off when the temperature continues increasing to reach an emergency threshold. Also, the transmission power is gradually increased to a normal value when the temperature decreases to a certain threshold. The solution of decreasing the transmission power of the wireless terminal is disadvantaged in that decreasing the transmission power may cause failure of accessing the network for the weak signal, thereby affecting user experience.

To sum up, all of the traditional arts fail to effectively solve the heating problem of the data card.

SUMMARY

The disclosure mainly aims to provide a method and apparatus for controlling temperature of data card, so as to at least solve the above-mentioned problem.

According to an aspect of the disclosure, a method for controlling temperature of data card is provided. The method comprises: sampling the temperature of protected element on the data card; and regulating the data transmission speed of the data card according to the sampled temperature to control the temperature of the data card.

Preferably, in the method, the step of sampling the temperature of protected element on the data card comprises sampling the temperature of protected element on the data card at preset time intervals.

Preferably, in the method, the data transmission speed belongs to a speed set $\{[0,0], [V_{D1}, V_{U1}], \ldots, [V_{DN}, V_{UN}], [V_{D(N+1)}, V_{U(N+1)}]\}$ which includes N+2 levels, wherein $V_D$ is a downlink speed level of the data card, $V_U$ is a uplink speed level of the data card, $V_{D(N+1)}$ is a maximum downlink speed level supported by the data card, and the $V_{U(N+1)}$ is a maximum uplink speed level supported by the data card; the uplink speed level increases step by step in ascending order, and the downlink speed level increases step by step in ascending order, too; the speed set is determined by computing according to the following formulae: $V_{Dn} = V_{D(N+1)}/2^{(N-n+1)}$, where $n=1, \ldots, N$; $V_{Un} = V_{U(N+1)}/2^{(N-n+1)}$, where $n=1, \ldots, N$.

Preferably, in the method, the step of regulating the data transmission speed of the data card according to the sampled temperature comprises controlling the uplink speed and/or the downlink speed of the data card according to the speed set.

Preferably, in the method, the step of regulating the data transmission speed of the data card according to the sampled temperature comprises comparing the sampled temperature with a preset threshold, and then determining the direction of regulating the data transmission speed and the speed level; and regulating the data transmission speed of the data card according to the determined direction and speed level.

Preferably, in the method, the threshold includes emergency threshold, high temperature threshold and low temperature threshold. If at least one of the sampled temperatures of the protected element on the data card is greater than or equal to the emergency threshold, then the method is to decrease the data transmission speed of the protected element to 0, and stop data transmission. If at least one of the sampled temperatures of the protected element on the data card is greater than or equal to the high temperature threshold and all of the sampled temperatures are less than the emergency threshold, then the method is to decrease the data transmission speed of the protected element by a speed level. If all of the sampled temperatures of the protected element on the data card are less than the low temperature threshold, then the method is to increase the data transmission speed of the protected element by a speed level. If all of the sampled temperatures of the protected element on the data card are less than the high temperature threshold and at least one of the sampled temperatures is greater than or equal to the low temperature threshold, then the method is to maintain the data transmission speed of the protected element unchanged.

Preferably, in the method, the data transmission speed of the data card is regulated by adopting the leaky bucket traffic shaping algorithm.

According to another aspect of the disclosure, a data card is provided. The data card comprises a temperature sampling module, which is configured to sample the temperature of the protected element on the data card; a temperature regulating module, which is configured to regulate the data transmission speed of the data card according to the result of the temperature sampling module to control the temperature of the data card.

Preferably, the temperature sampling module comprises: a timing unit, which is configured to set the period of sampling the temperature; a sampling unit, which is configured to sample the temperature of the protected element on the data card according to the period set by the timing unit.

Preferably, the temperature regulating module comprises a temperature protection algorithm sub-module, which is configured to output a speed control command according to the relation between the sampled temperature and the set threshold; and a speed control sub-module, which is configured to control the data transmission speed of the data card according to the speed control command.

Preferably, the temperature protection algorithm sub-module comprises a set setting unit, which is configured to set the transmission speed set $\{[0,0], [V_{D1}, V_{U1}], \ldots, [V_{DN}, V_{UN}],$

[$V_{D(N+1)}, V_{U(N+1)}$]} which includes N+2 levels, wherein $V_D$ is a downlink speed level of the data card, VU is a uplink speed level of the data card, $V_{D(N+1)}$ is a maximum downlink speed level supported by the data card, and the $V_{U(N+1)}$ is a maximum uplink speed level supported by the data card; the uplink speed level increases step by step in ascending order, and the downlink speed level increases step by step in ascending order, too. The speed set can be determined by computing according to the following formulae: $V_{Dn}=V_{D(N+1)}/2^{(N-n+1)}$, where n=1, ..., N; $V_{Un}=V_{U(N+1)}/2^{(N-n+1)}$, where n=1, ..., N. The temperature protection algorithm sub-module also includes a threshold setting unit, which is configured to set the protection threshold of the protected element on the data card, wherein the protection threshold is divided into the emergency threshold, the high temperature threshold and the low temperature threshold. Further, the temperature protection algorithm sub-module includes a determining unit, which is configured to compare the temperature sampling result of the sampling unit with the protection threshold, and then determine the threshold interval that the temperature sampling result belongs to; a command outputting unit, which is configured to output the speed control command according to the leaky bucket traffic shaping algorithm.

Preferably, the command outputting unit is configured to output a command of stopping data transmission if at least one of the temperature sampling results of the protected element on the data card is greater than or equal to the emergency threshold; to output a command of decreasing the data transmission speed if at least one of the temperature sampling results of the protected element on the data card is greater than or equal to the high temperature threshold and all of the temperature sampling results are less than the emergency threshold; to output a command of increasing the data transmission speed if all of the temperature sampling results of the protected element on the data card are less than the low temperature threshold; or not to output any command if all of the temperature sampling results of the protected element on the data card are less than the high temperature threshold and at least one of the temperature sampling results is greater than or equal to the low temperature threshold.

Preferably, the speed control sub-module comprises a receiving unit, which is configured to receive the speed control command output by the command outputting unit; and a regulating unit, which is configured to regulate the uplink and downlink data transmission speeds of the data card according to the speed control command. The specific regulating process comprises control the uplink speed and/or the downlink speed of the data card according to the speed levels in the speed set.

Preferably, the speed control sub-module is configured to, if it is the command of stopping data transmission received by the receiving unit, decrease the data transmission speed of the protected element to 0, and stop data transmission; if it is the command of decreasing the data transmission speed received by the receiving unit, decrease the data transmission speed of the protected element by a speed level; and if it is the command of increasing the data transmission speed received by the receiving unit, increase the data transmission speed of the protected element by a speed level.

The disclosure controls heat generated by the data card, realizes control of the temperature of the data card in a predetermined range, and avoids the element aging or element damage of a wireless data card by regulating the uplink and downlink data transmission speeds of the wireless data card.

BRIEF DESCRIPTION OF THE DRAWINGS

The accompanying drawings described here are used for providing a deeper understanding of the disclosure, and constitute a part of the application; the schematic embodiments and specification thereof of the disclosure are used for illustrating the disclosure and not intended to form improper limit to the disclosure. In the accompanying drawings.

DETAILED DESCRIPTION

The disclosure is described below with reference to the accompanying drawings and embodiments in detail. Note that, the embodiments and features in the embodiments in the application can be combined with each other on condition of not conflicting.

Figure 1:
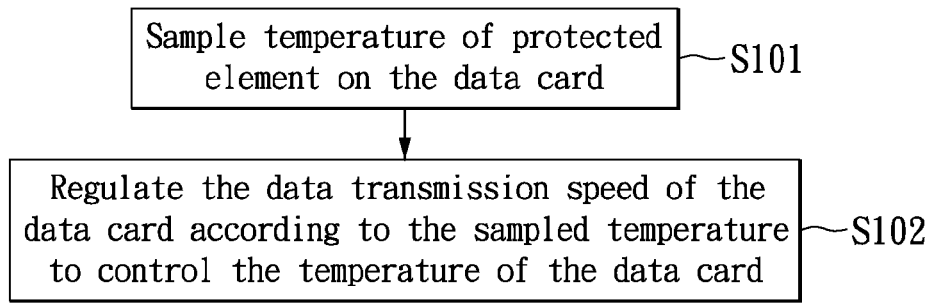
FIG. 1 shows a flowchart of a method for controlling temperature of data card according to the embodiment of the disclosure.

According to the embodiment of the disclosure, a method for controlling temperature of data card is provided; as shown in FIG. 1, the method comprises:

Step 101: sample the temperature of protected element on the data card;

Step 102: regulate the data transmission speed of the data card according to the sampled temperature to control the temperature of the data card.

Through the embodiment, the heat generated by the wireless data card is controlled. It is realized that the temperature of the wireless data card is controlled in a predetermined range and the element aging or element damage of the wireless data card is avoided by sampling the temperature of the heating element or the protected element on the data card regularly, and then regulating the uplink and downlink data transmission speeds of the wireless data card according to the temperature of each element and its preset temperature threshold.

Step 101 can be realized by the following way: sample the temperature of protected element on the data card at preset time intervals.

The transmission speed in Step 102 is the set below: the above-mentioned data transmission speed belongs to the speed set {[0,0], [$V_{D1}, V_{U1}$], ..., [$V_{DN}, V_{UN}$], [$V_{D(N+1)}, V_{U(N+1)}$]} which includes N+2 levels, wherein $V_D$ is a downlink speed level of the data card, $V_U$ is a uplink speed level of the data card, $V_{D(N+1)}$ is a maximum downlink speed level supported by the data card, and the $V_{U(N+1)}$ is a maximum uplink speed level supported by the data card. The uplink speed level increases step by step in ascending order, and the downlink speed level increases step by step in ascending order, too. The values of the speed set can be manually preset in ascending order, and can also be determined by computing according to the following formulae:

$$V_{Dn}=V_{D(N+1)}/2^{(N-n+1)}, \text{ where } n=1,\ldots,N;$$

$$V_{Un}=V_{U(N+1)}/2^{(N-n+1)}, \text{ where } n=1,\ldots,N.$$

The step of regulating the data transmission speed of the data card in Step 102 comprises controlling the uplink speed and/or the downlink speed of the data card according to the speed levels in the speed set. Specifically, the control mode comprises one or more of the followings:

1) controlling the uplink speed of the data card according to the uplink speed in the speed set without controlling the downlink speed of the data card; or 2) controlling the downlink speed of the data card according to the downlink speed in the speed set without controlling the uplink speed of the data card;

3) simultaneously controlling the uplink and downlink speeds of the data card according to the uplink and downlink speeds in the speed set.

The step of regulating the data transmission speed of the data card according to the sampled temperature in Step 102 comprises:

comparing the sampled temperature with the preset threshold, and then determine the direction of regulating the data transmission speed and the speed level;

regulating the data transmission speed of the data card according to the determined direction and speed level.

Preferably, the threshold comprises the emergency threshold, the high temperature threshold and the low temperature threshold.

If at least one of the sampled temperatures of the protected element on the data card is greater than or equal to the emergency threshold, then the process is to decrease the data transmission speed of the protected element to 0, and stop data transmission.

If at least one of the sampled temperatures of the protected element on the data card is greater than or equal to the high temperature threshold and all of the sampled temperatures are less than the emergency threshold, then the process is to decrease the data transmission speed of the protected element by a speed level;

If all of the sampled temperatures of the protected element on the data card are less than the low temperature threshold, then the process is to increase the data transmission speed of the protected element by a speed level;

If all of the sampled temperatures of the protected element on the data card are less than the high temperature threshold and at least one of the sampled temperatures is greater than or equal to the low temperature threshold, then the process is to maintain the data transmission speed of the protected element unchanged.

Step 101 and Step 102 adopt the leaky bucket traffic shaping algorithm to regulate the data transmission speed of the data card.

Figure 2:
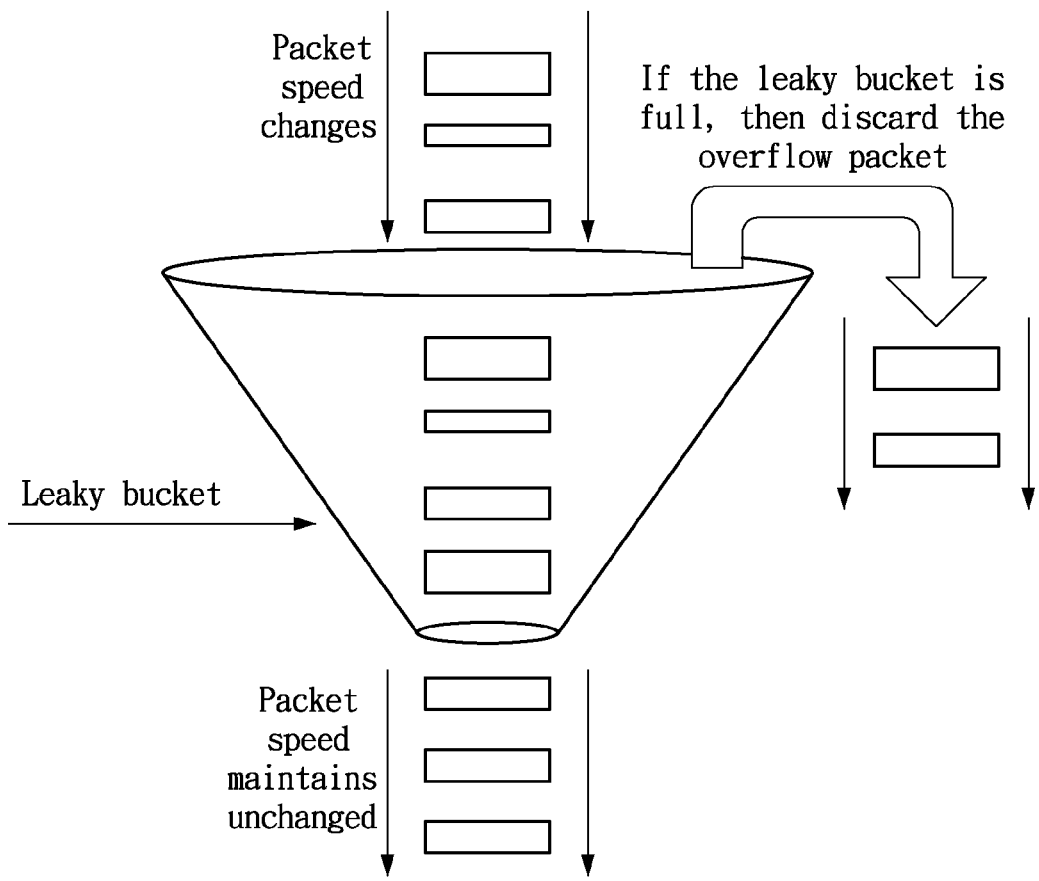
FIG. 2 shows a schematic diagram of the principle of realizing speed control of the leaky bucket according to the embodiment of the disclosure.

The speed control is realized by adopting the leaky bucket traffic shaping algorithm; the principle of the algorithm is shown in FIG. 2; if arriving, the packet is put in the leaky bucket; if the leaky bucket is full, the packet is discarded; the packet is transmitted at a constant speed, and the size of the packet is equal to that of the opening of the leaky bucket. Thus, the transmission speed of the packet can be controlled by controlling the size of the opening of the leaky bucket. When the speed of the packet data entering into the leaky bucket is higher than that of the packet data leaked by the leaky bucket, the packets in the leaky bucket will be accumulated slowly; finally, part of the packets is to be discarded because the leaky bucket is full. After the situation of discarding the packets is detected by a receiving terminal, the receiving terminal requires, through the Transmission Control Protocol (TCP)/User Datagram Protocol (UDP) transmission layer or application layer, a transmitting terminal to retransmit the discarded data. After the situation of packet is detected by the transmitting terminal, the transmitting terminal considers there is congestion happening in the transmission link, and then decreases the transmission speed, so as to ensure the reliable transmission of data.

Figure 3:
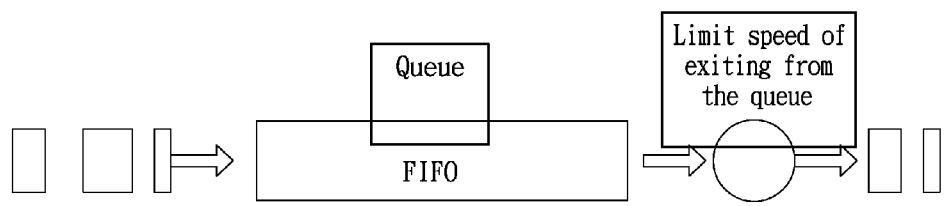
FIG. 3 shows a schematic diagram of the principle of using the First In First Out (FIFO) queue to realize speed control of the leaky bucket according to the embodiment of the disclosure.

The above is only an introduction of the principle of the leaky bucket; actually, the function of the leaky bucket can be realized by using a queue. FIG. 3 shows a schematic diagram of the principle of using the FIFO queue to realize the speed control function of the leaky bucket according to the embodiment of the disclosure. As shown in FIG. 3, when the packet messages coming from the network side or the PC side arrive at the wireless data card, a speed control module lets the messages enter into the FIFO queue according to the arriving sequence; at the same time, the speed control module lets the messages exit from the queue at the exit of the FIFO queue according to the sequence of entering into the queue, that is, the first entering message exits from the queue first, and the later entering message exits from the queue later; when the speed of the packet message entering into the FIFO queue is higher than the speed of the interface being capable of transmitting, the length of the FIFO queue increases; after the length of the queue reaches a certain maximum value, all the latest coming messages will be discarded because the queue is full. The speed control function can be realized by limiting the burst size s (byte) of packet message at the exit of the FIFO queue in unit time t (ms), and then the data transmission speed is regulated to be: V=8*(s/t) Kbps.

The function of controlling the different speed levels can be realized by adjusting the value of t and s. When s is 0, the data transmission speed is 0, which means the data transmission is stopped; supposing that the maximum uplink and downlink speeds of the data card are respectively $V_{U(N+1)}$ and $V_{D(N+1)}$ which correspond to a group of s and t; the speed levels between 0 and $V_{U(N+1)}$ and $V_{D(N+1)}$ can be manually set, and can also be determined by computing according to the following formulae:

$$V_{Dn}=V_{D(N+1)}/2^{(N-n+1)}, \text{ where } n=1,\ldots,N;$$

$$V_{Un}=V_{U(N+1)}/2^{(N-n+1)}, \text{ where } n=1,\ldots,N.$$

Embodiment 1

Figure 4:
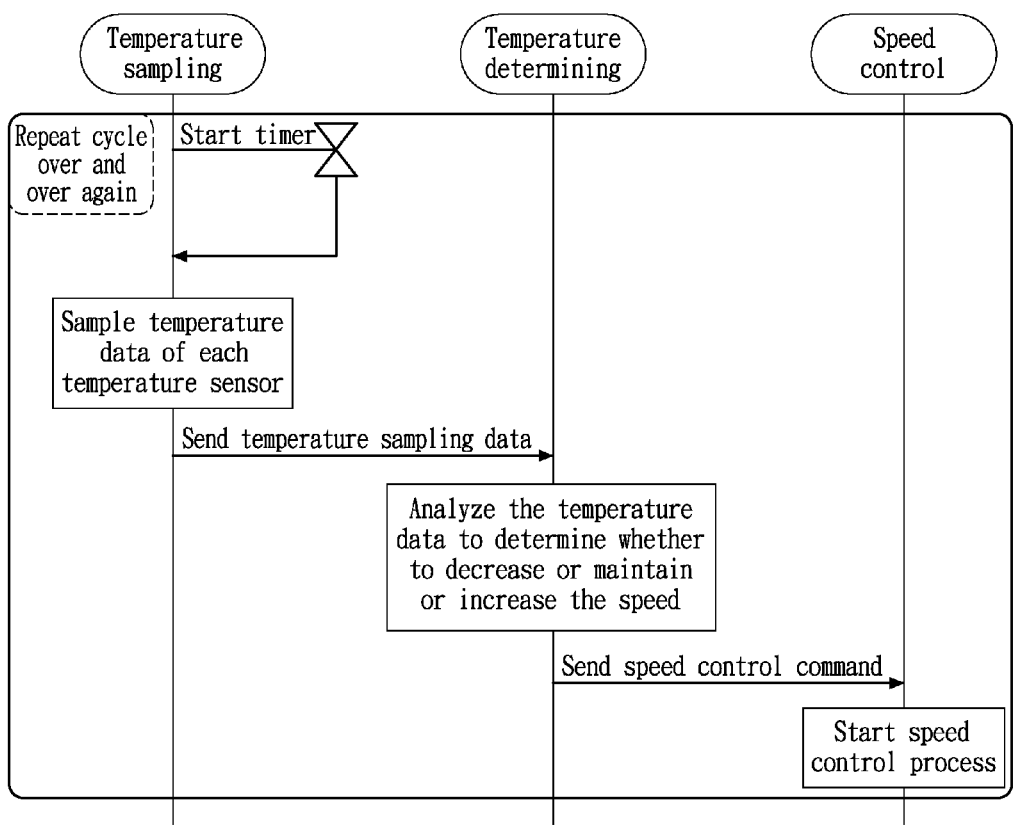
FIG. 4 shows a flowchart of a method for controlling temperature of data card according to the preferred embodiment of the disclosure.

FIG. 4 shows a flowchart of a method for controlling temperature of data card according to the preferred embodiment of the disclosure. The method controls temperature of the wireless data card by regulating the data transmission speed. As shown in FIG. 4, the method comprises the following specific steps:

Step 1: periodically sample the temperature sensor of one or more elements; the sampling period can be set according to the actual situation, and it is usually set as 1-20 s; the sampling period cannot be set to be too long, otherwise, the temperature of device cannot be controlled in time;

Step 2: compare the sampled temperature with the set threshold;

Step 3: control the transmission speed of data card; specifically, when the temperature of any element reaches or exceeds its emergency threshold, regulate the speed of the data card to be 0, that is, stop data transmission so as to cool the element rapidly, thereby avoiding the element damage or element aging; when the temperature of any element is greater than its high temperature threshold, decrease the transmission speed of the data card by a level; when the temperatures of all elements are less than their low temperature thresholds, increase the transmission speed of the data card by a level; when the temperatures of all elements are less than the high temperature threshold and the temperature of at least one element is greater than the low temperature threshold, maintain the transmission speed of the data card.

Controlling the speed can be controlling the uplink speed and the downlink speed of the data card, and the specific control mode is one or more of the following:

1) controlling the uplink speed of the data card according to the uplink speed in the speed set without controlling the downlink speed of the data card;

2) controlling the downlink speed of the data card according to the downlink speed in the speed set without controlling the uplink speed of the data card; and 3) simultaneously controlling the uplink and downlink speeds of the data card according to the uplink and downlink speeds in the speed set.

The high temperature threshold and the low temperature threshold can be set to be same or different. It is suggested here that they are set to be different, and the low temperature threshold is a bit less than the high temperature threshold. The aim of setting like this is to play a role of buffering the temperature change, because if the low temperature threshold and the high temperature threshold overlap, when the temperature decreases to be less than the high temperature threshold, a temperature protection module immediately sends a command of increasing speed to the speed control module. Once the speed increases, the temperature reaches the high temperature threshold very quickly, which causes the temperature protection module to immediately start the process of decreasing the speed again; once the speed decreases, the temperature decreases to be less than the high temperature threshold very quickly, which causes the temperature protection module to start the process of increasing the speed again. It is noted the repeat of this cycle will cause the temperature and speed to fluctuate quickly and violently. Whereas if the low temperature threshold and the high temperature threshold do not overlap, the speed and the temperature will not fluctuate so quickly and violently.

Figure 5:
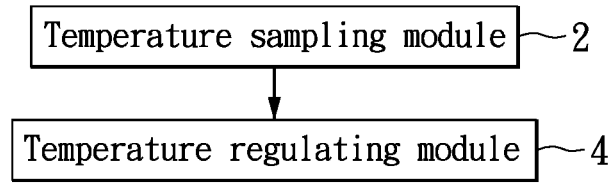
FIG. 5 shows a structural diagram of a data card according to the embodiment of the disclosure.

According to the embodiment of the disclosure, a data card is provided. FIG. 5 shows a structural diagram of a data card according to the embodiment of the disclosure; as shown in FIG. 5, the data card comprises: a temperature sampling module 2 and a temperature regulating module 4; the above structure is described below in detail.

The temperature sampling module 2 is configured to sample the temperature of the protected element on the data card. The temperature regulating module 4 is connected to the temperature sampling module 2 and configured to regulate the data transmission speed of the data card according to the result of the temperature sampling module to control the temperature of the data card.

Figure 6:
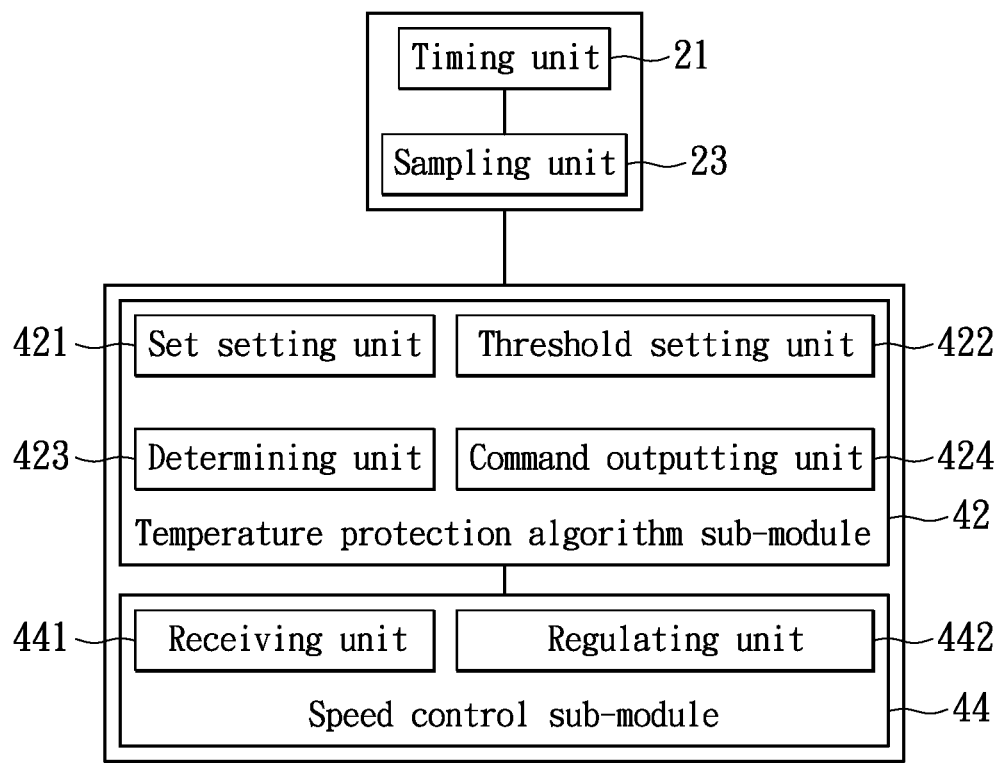
FIG. 6 shows a preferred structural diagram of a data card according to the embodiment of the disclosure.

Preferably, FIG. 6 shows a preferred structural diagram of a data card according to the embodiment of the disclosure; as shown in FIG. 6, the data card further comprises the following structure.

The temperature sampling module 2 comprises a timing unit 21 and a sampling unit 23.

The timing unit 21 is configured to set the period of sampling the temperature.

The sampling unit 23 is configured to sample the temperature of the protected element on the data card according to the period set by the timing unit 21.

The temperature regulating module 4 comprises a temperature protection algorithm sub-module 42 and a speed control sub-module 44.

The temperature protection algorithm sub-module 42 is configured to output a speed control command according to the relation between the sampled temperature and the set threshold.

The speed control sub-module 44 is configured to control the data transmission speed of the data card according to the speed control command.

Preferably, the temperature protection algorithm sub-module 42 further comprises: a set setting unit 421, a threshold setting unit 422, a determining unit 423 and a command outputting unit 424.

The set setting unit 421 is configured to set the transmission speed set $\{[0,0], [V_{D1},V_{U1}], \ldots, [V_{DN},V_{UN}], [V_{D(N+1)}, V_{U(N+1)}]\}$ which includes N+2 levels, wherein $V_D$ is the downlink speed level of the data card, $V_U$ is the uplink speed level of the data card, $V_{D(N+1)}$ is the maximum downlink speed level supported by the data card, and the $V_{U(N+1)}$ is the maximum uplink speed level supported by the data card; the uplink speed level increases step by step in ascending order, and the downlink speed level increases step by step in ascending order, too; the speed set can be determined by computing according to the following formulae:

$$V_{Dn}=V_{D(N+1)}/2^{(N-n+1)}, \text{where } n=1,\ldots,N;$$

$$V_{Un}=V_{U(N+1)}/2^{(N-n+1)}, \text{where } n=1,\ldots,N.$$

The threshold setting unit 422 is configured to set the protection threshold of the protected element on the data card, wherein the protection threshold is divided into the emergency threshold, the high temperature threshold and the low temperature threshold.

The determining unit 423 is configured to compare the temperature sampling result of the sampling unit with the protection threshold, and then determine the threshold interval that the temperature sampling result belongs to.

The command outputting unit 424 is configured to output the speed control command according to the leaky bucket traffic shaping algorithm.

Preferably, the speed control sub-module 44 further comprises: a receiving unit 441 and a regulating unit 442.

The receiving unit 441 is configured to receive the speed control command output by the command outputting unit.

The regulating unit 442 is configured to regulate the uplink and downlink data transmission speeds of the data card according to the speed control command, wherein the specific regulating process comprises: control the uplink speed and/or the downlink speed of the data card according to the speed levels in the speed set.

The process of realizing control of temperature of the data card is described below with reference to the embodiment in detail. Firstly, the temperature of the protected element on the data card is sampled by the temperature sampling module 2. Specifically, the temperature sampling period is set in the timing unit 21, and is usually set as 1-20 s. Then the sampling unit 23 samples the temperature of the protected element on the data card according to the temperature sampling period. The temperature sampling result is sent to the temperature regulating module to complete regulation of the temperature of the protected element on the data card. Specifically, the transmission speed set is set in the set setting unit 421 of the temperature protection algorithm sub-module 42. The temperature threshold is set in the threshold setting unit 422. The determining unit 423 compares the sampling result with the temperature threshold, and outputs the comparing result to the command outputting unit 424. The command outputting unit 424 outputs the speed control command to the speed control sub-module 44 according to the comparing result. The receiving unit 441 in the speed control sub-module 44 receives the speed control command. The regulating unit 442 regulates the data transmission speed of the protected element on the data card at the transmission speed set in the set setting unit 421. According to the speed control command, the process is to control the temperature of the data card finally.

It can be seen from the description above that the disclosure realizes the following technical effect: it achieves the purpose of controlling heat generated by the data card, realizing control of the temperature of the data card in a predetermined range, and avoiding the element aging or element damage of the wireless data card by regulating the uplink and downlink data transmission speeds of the wireless data card.

Obviously, the skilled personnel in the field should appreciate that above-mentioned modules and steps of the disclosure can be realized by a general-purpose computing device, and they can be centralized in a single computing device or distributed on a network composed of multiple computing devices; optionally, they can be realized by program code which is capable of being executed by the computing device, so that they can be stored in a storage device and executed by the computing device; in addition, under some conditions, the presented or described steps can be executed in an order different from that described here; or they are made into integrated circuit modules, respectively; or multiple modules and steps of them are made into a single integrated circuit module to realize. In this way, the disclosure is not limited to any particular combination of hardware and software.

The above is only the preferred embodiment of the disclosure and not intended to limit the disclosure; for the skilled personnel in the field, the disclosure may have various modifications and changes. Any modifications, equivalent replacements, improvements and the like within the spirit and principle of the disclosure shall fall within the scope of protection of the disclosure.

What is claimed is:

1. A method for controlling temperature of a data card, comprising:
   sampling temperature of a protected element on the data card; and
   regulating data transmission speed of the data card according to the sampled temperature to control the temperature of the data card;
   wherein the data transmission speed belongs to a speed set $\{[0,0], [V_{D1}, V_{U1}], \ldots, [V_{DN}, V_{UN}], [V_{D(N+1)}, V_{U(N+1)}]\}$ which includes N+2 levels, wherein $V_D$ is a downlink speed level of the data card, $V_U$ is a uplink speed level of the data card, $V_{D(N+1)}$ is a maximum downlink speed level supported by the data card, and the $V_{U(N+1)}$ is a maximum uplink speed level supported by the data card; the uplink speed level increases step by step in ascending order, and the downlink speed level increases step by step in ascending order; the speed is determined by computing according to the following formulae:

$V_{Dn} = V_{D(N+1)}/2^{(N-n+1)}$, where $n=1, \ldots, N$;

$V_{Un} = V_{U(N+1)}/2^{(N-n+1)}$, where $n=1, \ldots, N$.

2. The method according to claim 1, wherein the step of sampling the temperature of the protected element on the data card comprises:
   sampling the temperature of the protected element on the data card at preset time intervals.

3. The method according to claim 2, wherein the data transmission speed of the data card is regulated by adopting leaky bucket traffic shaping algorithm.

4. The method according to claim 1, wherein the step of regulating the data transmission speed of the data card according to the sampled temperature comprises:
   controlling the uplink speed and/or the downlink speed of the data card according to the speed set.

5. The method according to claim 4, wherein the data transmission speed of the data card is regulated by adopting leaky bucket traffic shaping algorithm.

6. The method according to claim 1, wherein the step of regulating the data transmission speed of the data card according to the sampled temperature comprises:
   comparing the sampled temperature with a preset threshold, and then determining the direction of regulating the data transmission speed and a speed level;
   regulating the data transmission speed of the data card according to the determined direction and speed level.

7. The method according to claim 6, wherein,
   the threshold comprises: an emergency threshold, a high temperature threshold and a low temperature threshold;
   if at least one of the sampled temperatures of the protected element on the data card is greater than or equal to the emergency threshold, then decreasing the data transmission speed of the protected element to 0, and stopping data transmission;
   if at least one of the sampled temperatures of the protected element on the data card is greater than or equal to the high temperature threshold and all of the sampled temperatures are less than the emergency threshold, then decreasing the data transmission speed of the protected element by a speed level;
   if all of the sampled temperatures of the protected element on the data card are less than the low temperature threshold, then increasing the data transmission speed of the protected element by a speed level;
   if all of the sampled temperatures of the protected element on the data card are less than the high temperature threshold and at least one of the sampled temperatures is greater than or equal to the low temperature threshold, then maintaining the data transmission speed of the protected element unchanged.

8. The method according to claim 7, wherein the data transmission speed of the data card is regulated by adopting leaky bucket traffic shaping algorithm.

9. The method according to claim 6, wherein the data transmission speed of the data card is regulated by adopting leaky bucket traffic shaping algorithm.

10. The method according to claim 1, wherein the data transmission speed of the data card is regulated by adopting leaky bucket traffic shaping algorithm.

11. A data card, comprising:
    a temperature sampling module, which is configured to sample temperature of a protected element on the data card; and
    a temperature regulating module, which is configured to regulate data transmission speed of the data card according to the result of the temperature sampling module to control temperature of the data card;
    wherein the temperature regulating module comprises:
    a temperature protection algorithm sub-module, which is configured to output a speed control command according to the relation between the sampled temperature and a set threshold; and
    a speed control sub-module, which is configured to control the data transmission speed of the data card according to the speed control command;

wherein the temperature protection algorithm sub-module comprises:
  a set setting unit, which is configured to set a transmission speed set $\{[0,0], [V_{D1}, V_{U1}], \ldots, [V_{DN}, V_{UN}], [V_{D(N+1)}, V_{U(N+1)}]\}$ which includes N+2 levels, wherein $V_D$ is a downlink speed level of the data card, $V_U$ is a uplink speed level of the data card, $V_{D(N+1)}$ is a maximum downlink speed level supported by the data card, and the $V_{U(N+1)}$ is a maximum uplink speed level supported by the data card; the uplink speed level increases step by step in ascending order, and the downlink speed level increases step by step in ascending order; the speed can be determined by computing according to the following formulae:

$V_{Dn} = V_{D(N+1)}/2^{(N-n+1)}$, where $n=1,\ldots,N$;

$V_{Un} = V_{U(N+1)}/2^{(N-n+1)}$, where $n=1,\ldots,N$;

a threshold setting unit, which is configured to set a protection threshold of the protected element on the data card, wherein the protection threshold is divided into an emergency threshold, a high temperature threshold and a low temperature threshold;
  a determining unit, which is configured to compare the temperature sampling result of the sampling unit with the protection threshold, and then determine the threshold interval that the temperature sampling result belongs to; and
  a command outputting unit, which is configured to output the speed control command according to leaky bucket traffic shaping algorithm.

12. The data card according to claim 11, wherein the temperature sampling module comprises:
  a timing unit, which is configured to set the period of sampling the temperature; and
  a sampling unit, which is configured to sample the temperature of the protected element on the data card according to the period set by the timing unit.

13. The data card according to claim 11, wherein the command outputting unit is configured to:
  if at least one of the temperature sampling results of the protected element on the data card is greater than or equal to the emergency threshold, output a command of stopping data transmission;
  if at least one of the temperature sampling results of the protected element on the data card is greater than or equal to the high temperature threshold and all of the temperature sampling results are less than the emergency threshold, output a command of decreasing the data transmission speed;
  if all of the temperature sampling results of the protected element on the data card are less than the low temperature threshold, output a command of increasing the data transmission speed;
  if all of the temperature sampling results of the protected element on the data card are less than the high temperature threshold and at least one of the temperature sampling results is greater than or equal to the low temperature threshold, not output any command.

14. The data card according to claim 11, wherein the speed control sub-module comprises:
  a receiving unit, which is configured to receive the speed control command output by the command outputting unit; and
  a regulating unit, which is configured to regulate the uplink and downlink data transmission speeds of the data card according to the speed control command, wherein a specific regulating process comprises: controlling the uplink speed and/or the downlink speed of the data card according to the speed levels in the speed set.

15. The data card according to claim 14, wherein the speed control sub-module is configured to:
  if it is the command of stopping data transmission received by the receiving unit, decrease the data transmission speed of the protected element to 0, and stop data transmission;
  if it is the command of decreasing the data transmission speed received by the receiving unit, decrease the data transmission speed of the protected element by a speed level;
  if it is the command of increasing the data transmission speed received by the receiving unit, increase the data transmission speed of the protected element by a speed level.

* * * * *